(12) United States Patent
Yoon

(10) Patent No.: US 6,256,272 B1
(45) Date of Patent: Jul. 3, 2001

(54) OPTICAL PICKUP

(75) Inventor: Yong Han Yoon, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 09/292,443

(22) Filed: Apr. 15, 1999

(30) Foreign Application Priority Data

Jul. 29, 1998 (KR) .................................................. 98-30495

(51) Int. Cl.$^7$ ....................................................... G11B 7/09
(52) U.S. Cl. ................................. 369/44.23; 369/44.37; 369/112.01; 369/112.05; 369/112.28
(58) Field of Search ........................ 369/112, 94, 44.23, 369/44.37, 110

(56) References Cited

U.S. PATENT DOCUMENTS

| | | | |
|---|---|---|---|
| 5,933,401 | * 8/1999 | Lee et al. | 369/44.37 |
| 5,974,020 | * 10/1999 | Ju et al. | 369/112 |
| 5,999,509 | * 12/1999 | Sugiura et al. | 369/112 |
| 6,064,637 | * 5/2000 | Ju et al. | 369/44.23 |
| 6,084,845 | * 7/2000 | Mizuno | 369/94 |
| 6,115,345 | * 9/2000 | Kato et al. | 369/44.23 |

FOREIGN PATENT DOCUMENTS 6150363    11/1992  (JP) .

OTHER PUBLICATIONS

Patent Abstract of Japan Publication No.: 06150363 Published May 31, 1994.

* cited by examiner

*Primary Examiner*—Thang V. Tran
(74) *Attorney, Agent, or Firm*—Ladas & Parry

(57) ABSTRACT

Disclosed is an optical pickup. The optical pickup comprises an optical disc; a first light source having an astigmatic difference and emitting a first laser beam of a first predetermined wavelength; a second light source emitting a second laser beam of a second predetermined wavelength which is different from the first predetermined wavelength; a first beam splitter arranged on a path of the first laser beam for reflecting the first laser beam; a second beam splitter disposed at one side of the first beam splitter such that it has a predetermined sloping angle, for reflecting the second laser beam toward the optical disc and for generating an astigmatism which can offset the astigmatic difference of the first light source when the first laser beam passes therethrough; a reflecting mirror for totally reflecting the second laser beam which is reflected by the second beam splitter and the first laser beam which passes through the second beam splitter; a collimator lens for shaping the laser beams reflected by the reflecting mirror into parallel lights; an objective lens for spotting the parallel light beams shaped by the collimator lens onto the optical disc; and a photodiode arranged at the other side of the first beam splitter for detecting an error signal from the laser beams which are spotted and reflected onto and from the optical disc.

24 Claims, 5 Drawing Sheets

OPTICAL PICKUP

BACKGROUND OF THE INVENTION

1. Field of the Invention

The present invention relates to an optical pickup, and more particularly, the present invention relates to an optical pickup for spotting lights emitted from two light sources having different wavelengths onto an optical disc, which adjusts an astigmatic difference of one light source emitting a light through a flat beam splitter, thereby to reduce aberrations of beams spotted onto the optical disc.

2. Description of the Related Art

Generally, optical discs are widely used these days because they can record and reproduce information at a relatively high density when compared to a long play record (LP) or a magnetic recording tape and can be kept semi-permanently. The technology of compact discs (CD) is most widely spread and such discs are used as optical discs. However, since compact discs have a limited recording capacity, they cannot be reliably used for movies, music, games, or other multimedia which have a playing time exceeding, for example, 90 minutes. For this reason, it is necessary to prepare two or more discs and have them run successively.

To resolve this problem, a digital video disc (DVD) is recently developed as a next generation optical disc. A DVD has a memory capacity which is 25 times that of a CD and can read ten million bit data per second. This is because the DVD has pits and tracks which correspond to halves of those of a CD. In other words, because a pit and a track of the DVD are about 0.4 feet and 0.8 micron, respectively, a high density recording is possible. Accordingly, due to this high capacity and operational capability, the DVD can be easily used in various fields such as movies, music, games or other multimedia.

On the other hand, while an optical pickup can be provided for exclusively playing back the DVD, it is preferred that both a CD and a DVD be played back by the same player in view of economics. Accordingly, a demand for an optical pickup which can play back a CD and a DVD, is gradually increasing among consumers.

Referring to FIG. 1, there is shown a schematic view of an optical pickup of the related art, which uses two light sources in order to play back both a CD and a DVD. The optical pickup of the related art includes a first light source 1 for recording and reproducing information onto and from a digital video disc D using a laser diode which emits a beam of 650 nm wavelength. The optical pickup also includes a second light source 2 for recording and reproducing information onto and from a compact disc D' using a laser diode which emits a beam of 780 nm wavelength. The second light source 2 is positioned such that it is parallel to the first light source 1.

A flat beam splitter 3 is arranged on a path of the beam emitted from the first light source 1, and a cubic beam splitter 4 is arranged on a path of the beam emitted from the second light source 2. The optical pickup includes a reflecting lens 9 for directing beams which are emitted from the first and second light sources 1 and 2 and then reflected from the flat beam splitter 3 and the cubic beam splitter 4, toward the digital video disc D and the compact disc D', and a collimator lens 5 for shaping the beams reflected from the reflecting lens 9. The optical pickup further includes an objective lens 6 for spotting the beams shaped by the collimator lens 5 onto the digital video disc D and the compact disc D', and a photodiode 8 for detecting recorded information and an error from the beams reflected from the digital video disc D and the compact disc D'.

The optical pickup of the prior art, constructed as mentioned above, has an advantage in that stable recording and reproducing operations are ensured. This is because an aberration is generated only in a small amount during the travel of the beams emitted from the first and second light sources 1 and 2 and reflected by the flat beam splitter 3 and the cubic beam splitter 4 to be spotted onto the optical discs.

However, since the costly cubic beam splitter 4 must be used in order to obtain such a stable spot, expenses of the optical pickup are increased. Also, since the first and second light sources 1 and 2 are disposed in side-by-side relationships with the flat beam splitter 3 and the cubic beam splitter 4, respectively, a relatively wide installation space is needed and it is difficult to manufacture a compact optical system.

Referring to FIG. 2, there is shown a schematic view of another optical pickup of the related art, which uses two light sources. The optical pickup uses an anisometrical hologram beam splitter 3a. In this respect, first and second light sources 1 and 2 are slopingly mounted such that they define predetermined angles to a plane of the hologram beam splitter 3a.

On a path of the beams which are emitted from the first and second light sources 1 and 2 and passes through the hologram beam splitter 3a, there are sequentially disposed a flat beam splitter 4a, a collimator lens 5 for shaping the beams, and an objective lens 6 for spotting the beams onto optical discs. The flat beam splitter 4a is slopingly mounted. The optical pickup also includes a photodiode 8 for detecting recorded information and an error signal from the beams reflected by optical discs. The photodiode 8 is disposed such that it is opposite to the flat beam splitter 4a.

While the optical pickup of the related art, constructed as mentioned above, has an advantage in that without using a cubic beam splitter, expenses are reduced, it still suffers from defects in that, due to wavelength variations of the beams emitted from the first and second light sources 1 and 2, a flickering of an optical axis is caused in an entire optical system. That is, in the case of a conventional laser diode, a wavelength variation through ±20 nm is caused, due to a variation in a surrounding temperature of the optical system.

Accordingly, in the case where the anisometrical hologram is used as described above, since angles of a wave front and a wave tail are changed so that a tilt of a light axis exceeding 0.2° is caused at an exit side of the light, a configuration of a light spotted onto the optical disc is deteriorated. At the same time, due to the fact that a position of a light spotted onto the photodiode is changed relying upon a wavelength, in the case where the light is focused onto the photodiode, it is impossible for the optical system to calculate a focusing error of the optical disc in terms of quantity of light which is spotted onto a portion of the 4-divided photodiode. Namely, since a quantity distribution of the light which is spotted onto the photodiode is lop-sided, it is impossible to calculate through the photodiode, whereby a focusing error is caused.

Referring to FIG. 3, there is shown a schematic view of still another optical pickup of the related art, which uses two light sources. This type of optical pickup is disclosed in Japanese Patent Laid-Open Publication No. Heisei 6-150363. In the structure of the optical pickup, first and second light sources 101 and 102 are arranged such that they are orthogonal to each other. On a point where beams emitted from the first and second light sources 101 and 102 cross with each other, there is positioned a phase plate 103 for passing and reflecting the beams. Also, collimator lenses 104 and 105 for shaping the incident beams into parallel lights are positioned in front of the first and second light sources 101 and 102, respectively.

A beam splitter 106 for reflecting the beams onto an optical recording medium D is positioned in front of the phase plate 103. An objective lens 107 is provided as means for spotting the beams reflected by the beam splitter 106 onto the optical recording medium D. The objective lens 107 is located above the beam splitter 106. Polarization light splitting means 108 for dividing the beams reflected from the optical recording medium D into a main beam and a sub beam is located below the beam splitter 106. A photodiode 109 onto which the main beam and sub beam divided by the polarization light splitting means 108 are spotted, is located below the polarization light splitting means 108 as photodetecting means for separately detecting light intensities of the main beam and the sub beam.

In the optical pickup constructed as mentioned above, since the beams emitted from the first and second light sources 101 and 102 and having different light intensities are separately detected by the photodetecting means, that is, the photodiode 109, generation of cross torque is suppressed, whereby it is possible to realize an optical head of high density. However, although the beams emitted from the first and second light sources 101 and 102 have different light intensities, because they have the same wavelength, the optical pickup can record and reproduce information to and from only one optical recording medium. Hence, it is impossible for the optical pickup to be adapted for recording and reproducing information to and from both a CD and a DVD as demanded in the present invention.

SUMMARY OF THE INVENTION

Accordingly, the present invention has been made in an effort to solve the problems occurring in the related art, and an object of the present invention is to provide an optical pickup which can stably perform recording and reproducing operations to and from a plurality of optical recording mediums, can offset an astigmatism generated in a flat beam splitter and an astigmatic difference of a laser diode by each other thereby to enable an optical system to be easily constructed, and especially, can reduce manufacturing cost by not using a costly cubic beam splitter.

According to one aspect of the present invention, there is provided an optical pickup comprising: a first light source having an astigmatic difference and emitting a first laser beam of a first predetermined wavelength toward an optical disc; a second light source emitting a second laser beam of a second predetermined wavelength which is different from the first predetermined wavelength, toward the optical disc; a first beam splitter arranged on a path of the first laser beam emitted from the first light source having the astigmatic difference, for reflecting the first laser beam toward the optical disc; a second beam splitter disposed at one side of the first beam splitter such that it has a predetermined sloping angle, for reflecting the second laser beam emitted from the second light source toward the optical disc and for generating an astigmatism which can offset the astigmatic difference of the first light source when the first laser beam emitted from the first light source passes therethrough; a reflecting mirror for totally reflecting the second laser beam which is emitted from the second light source and reflected by the second beam splitter and the first laser beam which is emitted from the first light source and passes through the second beam splitter; a collimator lens for shaping the laser beams reflected by the reflecting mirror into parallel lights; an objective lens for spotting the parallel light beams shaped by the collimator lens onto the optical disc; and a photodiode arranged at the other side of the first beam splitter for detecting an error signal from the beams which are reflected from the optical disc.

According to another aspect of the present invention, there is provided an optical pickup comprising: a first light source having an astigmatic difference and emitting a first laser beam of a first predetermined wavelength toward an optical disc; a second light source emitting a second laser beam of a second predetermined wavelength which is different from the first predetermined wavelength, toward the optical disc; a first beam splitter arranged on a path of the first laser beam emitted from the first light source having the astigmatic difference, for reflecting the first laser beam toward the optical disc; a diffraction grating positioned between the first beam splitter and the first light source, for dividing the first laser beam emitted from the first light source into 3 beams; a second beam splitter disposed at one side of the first beam splitter such that it has a predetermined sloping angle, for reflecting the second laser beam emitted from the second light source toward the optical disc and for generating an astigmatism which can offset the astigmatic difference of the first light source when the first laser beam emitted from the first light source passes therethrough; a reflecting mirror for totally reflecting the second laser beam which is emitted from the second light source and reflected by the second beam splitter and the first laser beam which is emitted from the first light source and passes through the second beam splitter; a collimator lens for shaping the laser beams reflected by the reflecting mirror into parallel lights; an objective lens for spotting the parallel light beams shaped by the collimator lens onto the optical disc; and a photodiode arranged at the other side of the first beam splitter for detecting an error signal from the beams which are reflected from the optical disc.

According to still another aspect of the present invention, there is provided an optical pickup comprising: a first light source having an astigmatic difference and emitting a first laser beam of a first predetermined wavelength toward an optical disc; a second light source emitting a second laser beam of a second predetermined wavelength which is different from the first predetermined wavelength, toward the optical disc; a first beam splitter positioned between the first light source and the second light source such that it has a predetermined sloping angle, for reflecting the second laser beam emitted from the second light source toward the optical disc and for generating an astigmatism which can offset the astigmatic difference of the first light source when the first laser beam emitted from the first light source passes therethrough; a diffraction grating positioned between the first beam splitter and the first light source, for dividing the first laser beam emitted from the first light source into 3 beams; a second beam splitter for reflecting the second laser beam which is emitted from the second light source and reflected by the first beam splitter and the first laser beam which is emitted from the first light source and passes through the first beam splitter; a reflecting mirror for totally reflecting the first and second laser beams reflected by the second beam splitter, toward the optical disc; a collimator lens for shaping the laser beams reflected by the reflecting mirror into parallel lights; an objective lens for spotting the parallel light beams shaped by the collimator lens onto the optical disc; and a photodiode arranged at one side of the second beam splitter which is opposite to the reflecting mirror, for detecting an error signal from the beams which are reflected from the optical disc.

According to yet still another aspect of the present invention, there is provided an optical pickup comprising: a first light source having an astigmatic difference and emitting a first laser beam of a first predetermined wavelength toward an optical disc; a second light source emitting a second laser beam of a second predetermined wavelength which is different from the first predetermined wavelength, toward the optical disc; a grating lens positioned between the first light source and the second light source such that it has a predetermined sloping angle, for reflecting the second laser beam emitted from the second light source toward the optical disc and for generating an astigmatism which can offset the astigmatic difference of the first light source when the first laser beam emitted from the first light source passes therethrough, the grating lens being formed with a grated plane on its surface which faces the first light source, the grated plane dividing the first laser beam emitted from the first light source into 3 beams; a beam splitter for reflecting the second laser beam which is emitted from the second light source and reflected by the grating lens and the first laser beam which is emitted from the first light source and passes through the grating lens; a reflecting mirror for totally reflecting the first and second laser beams reflected by the beam splitter, toward the optical disc; a collimator lens for shaping the laser beams reflected by the reflecting mirror into parallel lights; an objective lens for spotting the parallel light beams shaped by the collimator lens onto the optical disc; and a photodiode arranged at one side of the beam splitter which is opposite to the reflecting mirror, for detecting an error signal from the beams which are reflected from the optical disc.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
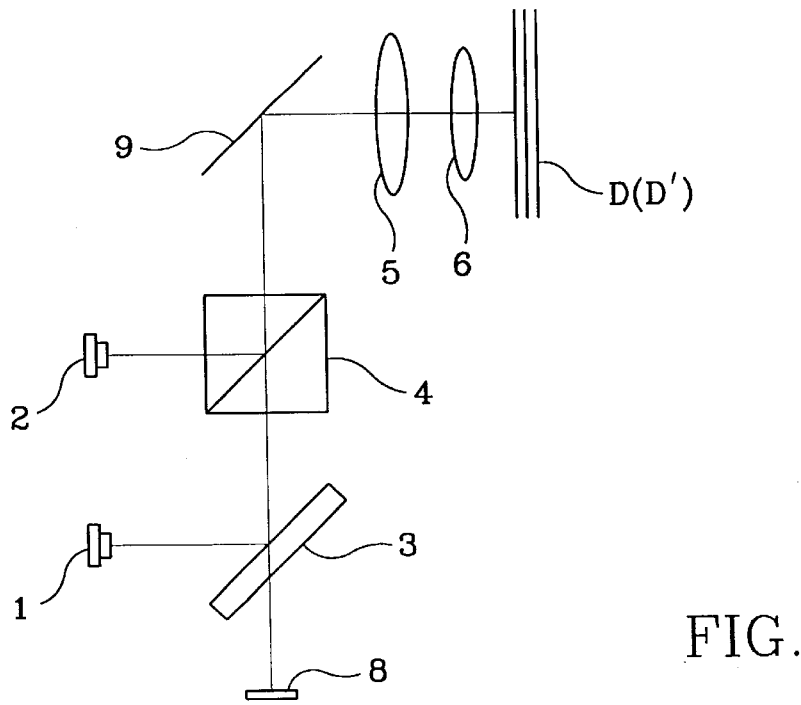
FIGS. 1 through 3 are schematic views illustrating various optical pickups according to the related art.
Figure 2:
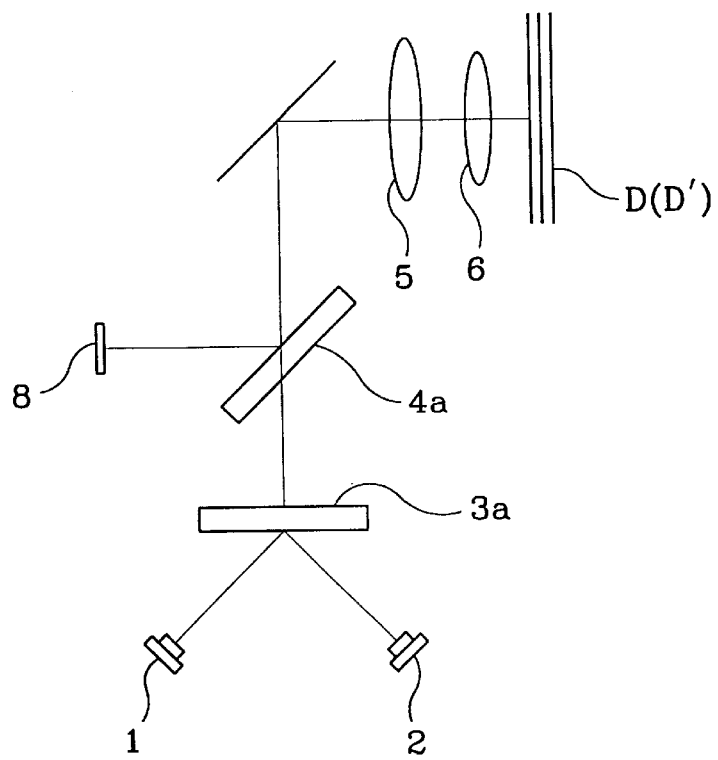
Figure 3:
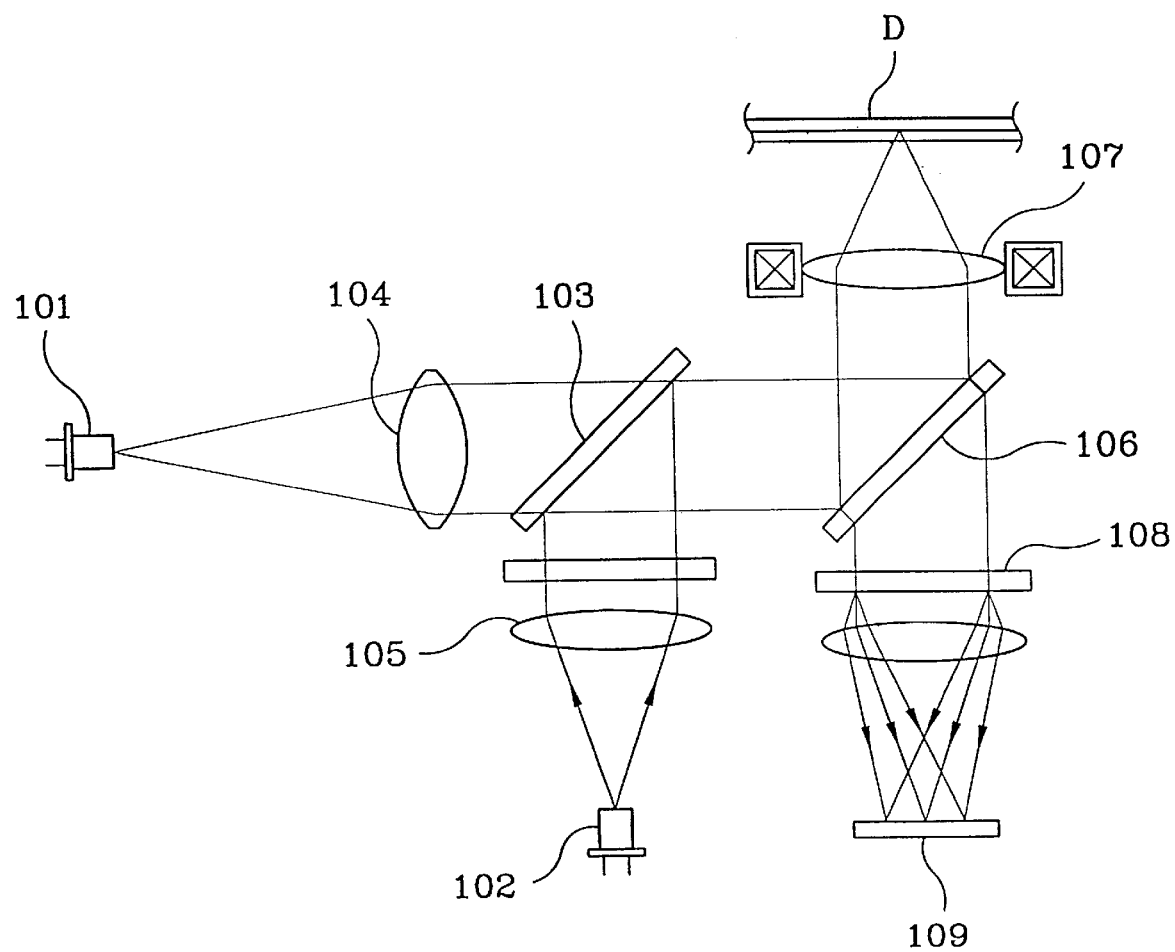

Reference will now be made in greater detail to a preferred embodiment of the invention, an example of which is illustrated in the accompanying drawings. Wherever possible, the same reference numerals will be used throughout the drawings and the description to refer to the same or like parts.

Figure 6:
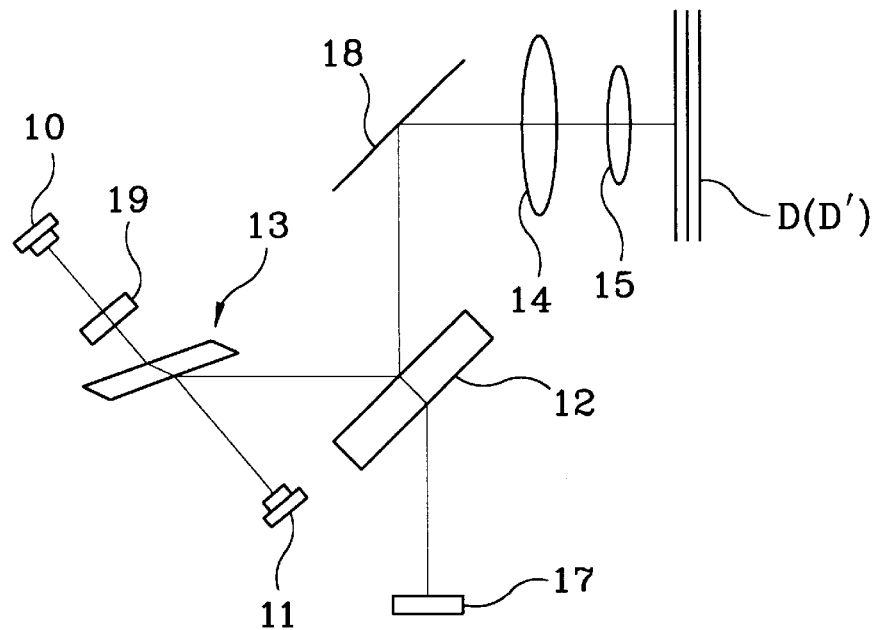
Figure 7:
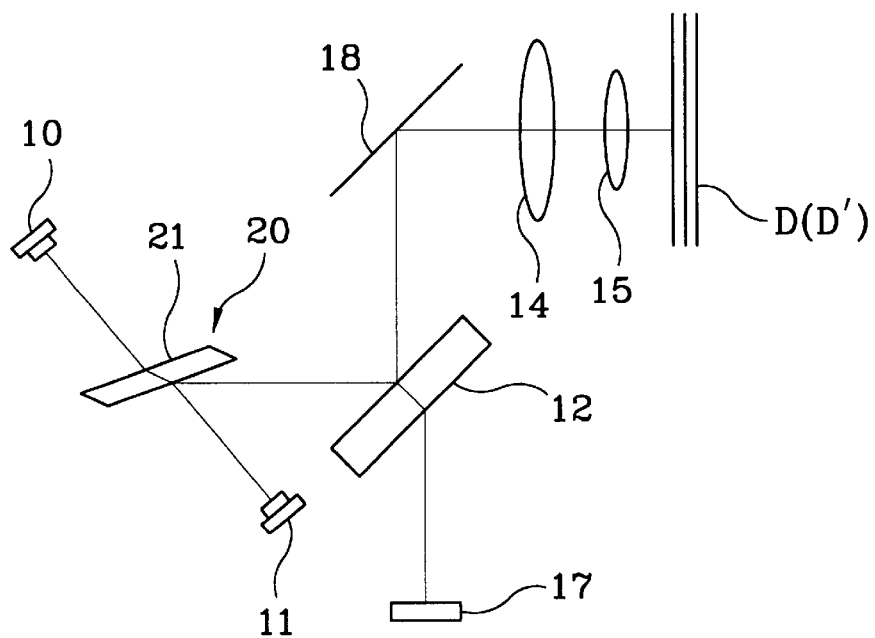
Figure 8:
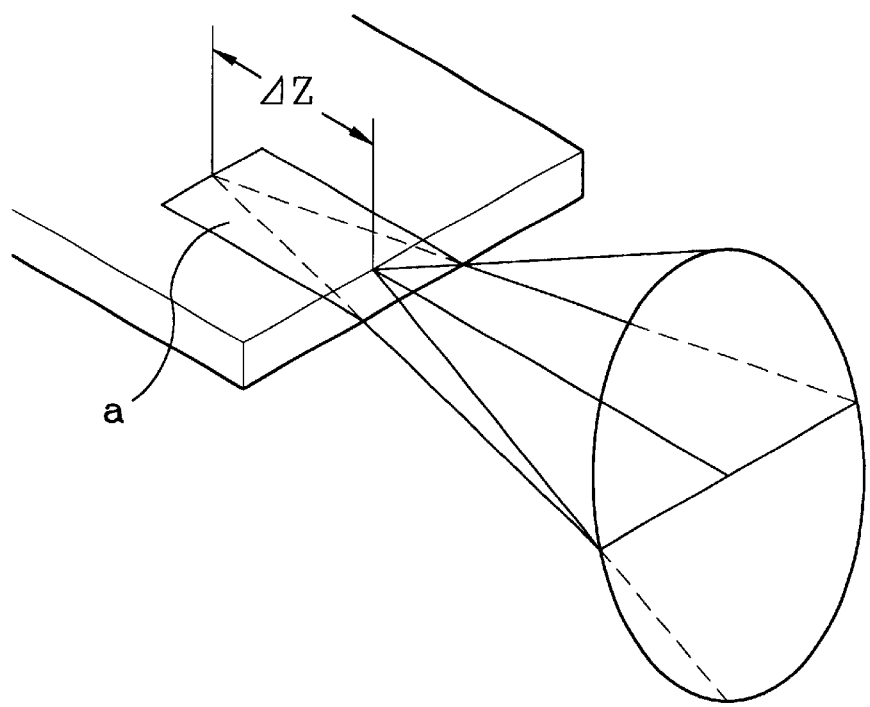
FIGS. 8 and 9 are schematic views for explaining a principle based on which an optical system of an optical pickup is realized.
Figure 9:
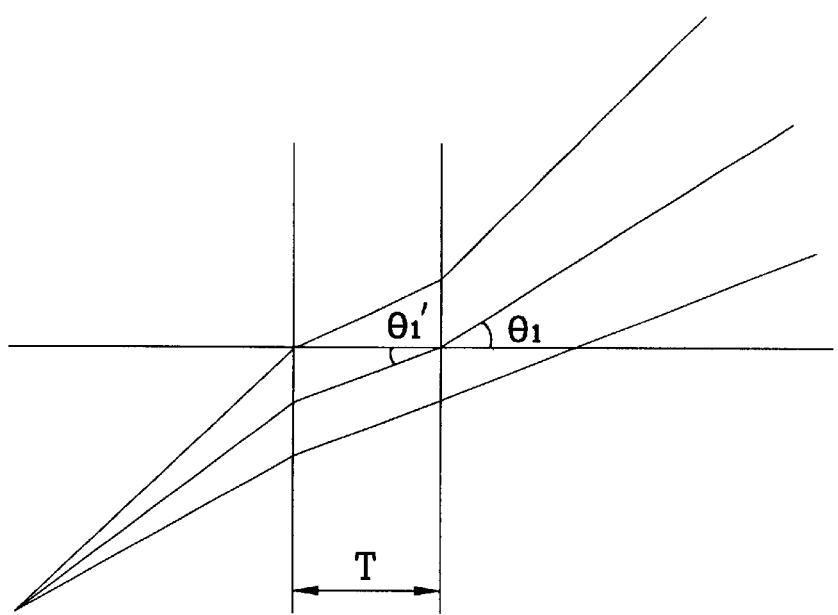

FIGS. 4 through 7 are views illustrating various optical pickups in accordance with embodiments of the present invention, and FIGS. 8 and 9 are schematic views for explaining a principle based on which an optical system of an optical pickup is realized.

Figure 4:
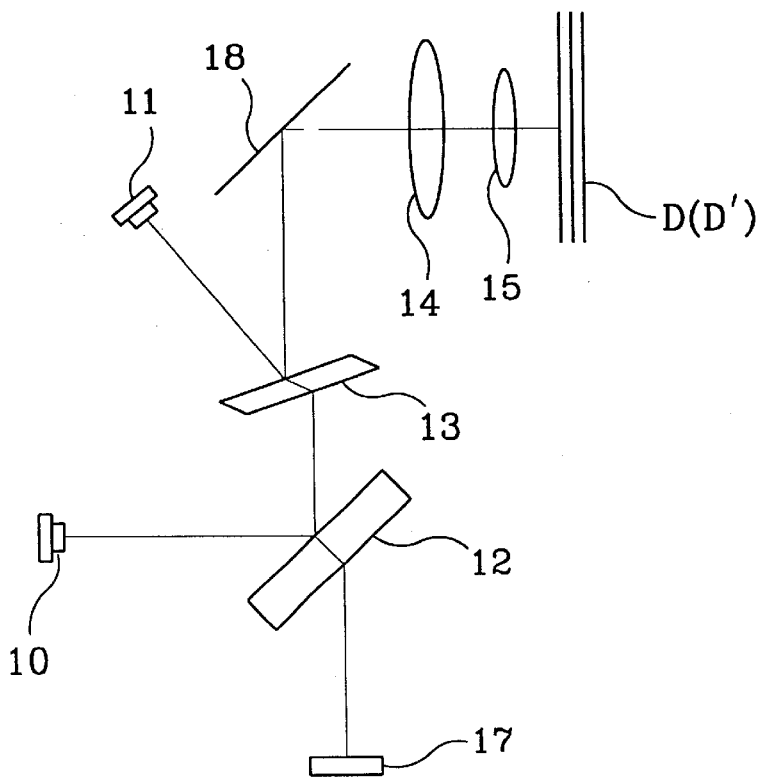
FIGS. 4 through 7 are views illustrating various optical pickups in accordance with embodiments of the present invention.

First, an optical pickup in accordance with a first embodiment of the present invention will be described with reference to FIG. 4. The optical pickup includes an optical disc D, a first light source 10 which emits a first laser beam of a first predetermined wavelength toward the optical disc D, and a second light source 11 which emits a second laser beam of a second predetermined wavelength which is different from the first predetermined wavelength, toward the optical disc D. The first light source 10 has a predetermined astigmatic difference.

In other words, as shown in FIG. 8, a light emitting section a of a laser diode which constitutes the first light source 10, has a predetermined thickness, and according to this, has an astigmatic difference of $\Delta Z$ in a parallel direction.

A first beam splitter 12 which is arranged on a path of the first laser beam of the first light source 10 having the astigmatic difference, functions to reflect the first laser beam emitted from the first light source 10. A second beam splitter 13 is disposed at one side of the first beam splitter 12. The second beam splitter 13 has a predetermined thickness and a predetermined sloping angle such that it reflects the second laser beam emitted from the second light source 11 and generates an astigmatism which can offset the astigmatic difference of the first light source 10 when the first laser beam emitted from the first light source 10 passes therethrough.

A reflecting mirror 18 is provided such that it reflects the second laser beam which is emitted from the second light source 11 and reflected by the second beam splitter 13 and the first laser beam which is emitted from the first light source 10 and passes through the second beam splitter 13, toward the optical disc D. Further, a collimator lens 14 for shaping the beams reflected by the reflecting mirror 18 into parallel lights and an objective lens 15 for spotting the parallel light beams shaped by the collimator lens 14 onto the optical disc D are sequentially aligned. A photodiode 17 is arranged at the other side of the first beam splitter 12 to detect an error signal from the beams which are reflected from the optical disc D.

At this time, a digital video disc or a compact disc may be used as the optical disc D. When a digital video disc is used as the optical disc D, the first light source 10 is a laser diode which emits a laser beam of 650 nm wavelength, and the second light source 11 is a laser diode which emits a laser beam of 780 nm wavelength. On the contrary, the first light source 10 may be a laser diode which emits a laser beam of 780 nm wavelength, and the second light source 11 may be a laser diode which emits a laser beam of 650 nm wavelength.

In the present invention, if the optical pickup constructed as mentioned above is operated using the first light source 10, the astigmatism is generated while the first beam passes through the second beam splitter 13 after being reflected by the first beam splitter 12.

In other words, as shown in FIG. 9, on the basis that a flat beam splitter is installed to have a sloping angle of 45°, when assuming that $\theta_1$ and $\theta_1'$ are an incident angle and a refracting angle of the first beam emitted from the first light source 10, respectively, n is an index of refraction of the second beam splitter 13 and T is a thickness of the second beam splitter 13, an astigmatism is generated as given in an equation 1 described below:

$$\overline{Q_1 Q_2} = \frac{1}{n\cos\theta_1'}\left[1 - \frac{\cos^2\theta_1}{\cos^2\theta_1'}\right]T \qquad \text{Equation 1}$$

In the equation 1, when assuming that $\theta_1 = 45°$, n=1.51452 and T=2.0 mm according to an installation state of the conventional beam splitter, an astigmatism of about 0.539 mm is actually generated.

Accordingly, when the astigmatic difference of the first light source 10 and the astigmatism are made to be the same, a parallel beam not having an astigmatism will be spotted onto the optical disc D. However, for practical purposes, the astigmatic difference of the first light source 10 can not be established to exceed about 0.54 mm. This is because the astigmatic difference exceeding 0.54 mm is not suitable for a DVD optical system which is largely influenced by a coma aberration. Therefore, a laser diode practically employed, that is, having the astigmatic difference of about 27 μm as recently used in the art, must be adopted.

As described above, when the first light source 10 having a laser diode of about 27 μm astigmatic difference is adopted, the second beam splitter 13 should be chosen so that it generates an astigmatism which offsets the astigmatic difference. In order to obtain an optimum value of the astigmatic difference from the equation 1, when assuming that the sloping angle of the second beam splitter 13 ($\theta_1$) is 18°, an index of refraction of the second beam splitter 13 (n) is 1.51452 and the astigmatism, that is, the astigmatic difference of the first light source 10 is 27 μm, a thickness of the second beam splitter 13 (T) equals about 0.71 mm. In this connection, it is to be readily understood that these values can be varied relying upon an astigmatic difference of the laser diode of the first light source 10.

Figure 5:
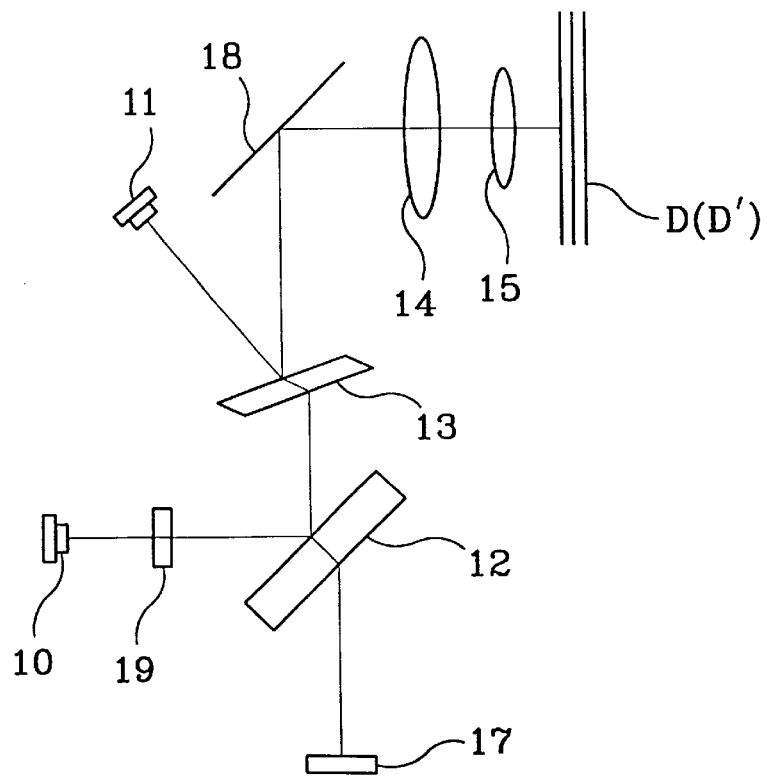

Referring to FIG. 5, there is shown an optical pickup in accordance with a second embodiment of the present invention. In this embodiment, the same reference numerals are to be used to refer to parts which are the same as those of the first embodiment.

The optical pickup of this embodiment has the same construction as that of the first embodiment, except that a diffraction grating for dividing a beam into 3 beams is used in this embodiment to allow an error detecting operation and especially a tracking error detecting operation to be easily performed.

The optical pickup of this embodiment includes an optical disc D, a first light source 10 which emits a first laser beam of a first predetermined wavelength toward the optical disc D, and a second light source 11 which emits a second laser beam of a second predetermined wavelength which is different from the first predetermined wavelength, toward the optical disc D. The first light source 10 has a predetermined astigmatic difference.

In other words, as shown in FIG. 8, a light emitting section a of a laser diode which constitutes the first light source 10, has a predetermined thickness, and according to this, has an astigmatic difference of ΔZ in a parallel direction.

A first beam splitter 12 which is arranged on a path of the first laser beam of the first light source 10 having the astigmatic difference, functions to reflect the first laser beam emitted from the first light source 10.

The diffraction grating 19 is positioned between the first beam splitter 12 and the first light source 10, to divide the first laser beam emitted from the first light source 10 into 3 beams. According to this, the first laser beam emitted from the first light source 10 passes through the diffraction grating 19 to be divided into 3 beams.

A second beam splitter 13 is disposed at one side of the first beam splitter 12. The second beam splitter 13 has a predetermined thickness and a predetermined sloping angle such that it reflects the second laser beam emitted from the second light source 11 and generates an astigmatism which can offset the astigmatic difference of the first light source 10 when the first laser beam emitted from the first light source 10 passes therethrough.

A reflecting mirror 18 is provided such that it reflects the second laser beam which is emitted from the second light source 11 and reflected by the second beam splitter 13 and the first laser beam which is emitted from the first light source 10 and passes through the second beam splitter 13, toward the optical disc D. Further, a collimator lens 14 for shaping the beams reflected by the reflecting mirror 18 into parallel lights and an objective lens 15 for spotting the parallel light beams shaped by the collimator lens 14 onto the optical disc D are sequentially aligned. A photodiode 17 is arranged at the other side of the first beam splitter 12 to detect an error signal from the beams which are reflected from the optical disc D.

At this time, a digital video disc or a compact disc may be used as the optical disc D. When a digital video disc is used as the optical disc D, the first light source 10 is a laser diode which emits a laser beam of 650 nm wavelength, and the second light source 11 is a laser diode which emits a laser beam of 780 nm wavelength. On the contrary, the first light source 10 may be a laser diode which emits a laser beam of 780 nm wavelength, and the second light source 11 may be a laser diode which emits a laser beam of 650 nm wavelength.

In this second embodiment of the present invention, a stable spot can be achieved on the optical disc D using the same method as in the first embodiment. Particularly, since the first laser beam emitted from the first light source 10 is divided into 3 beams by the diffraction grating 19, when an error is detected through the photodiode 17, specifically, a tracking error can be easily detected.

Referring to FIG. 6, there is shown an optical pickup in accordance with a third embodiment of the present invention. In this embodiment, the same reference numerals are to be used to refer to parts which are the same as those of the first and second embodiments.

The optical pickup of this embodiment includes an optical disc D, a first light source 10 which emits a first laser beam of a first predetermined wavelength toward the optical disc D, and a second light source 11 which emits a second laser beam of a second predetermined wavelength which is different from the first predetermined wavelength, toward the optical disc D. The first light source 10 has a predetermined astigmatic difference.

In other words, as shown in FIG. 8, a light emitting section a of a laser diode which constitutes the first light source 10, has a predetermined thickness, and according to this, has an astigmatic difference of ΔZ in a parallel direction.

A second beam splitter 13 is arranged on a path of the first laser beam of the first light source 10 having the astigmatic difference. The second beam splitter 13 has the same sloping angle and thickness, and generates the same astigmatism, as that of the first and second embodiments.

A diffraction grating 19 is positioned between the second beam splitter 13 and the first light source 10, to divide the first laser beam emitted from the first light source 10 into 3 beams. According to this, the first laser beam emitted from the first light source 10 passes through the diffraction grating 19 to be divided into 3 beams.

A first beam splitter 12 is disposed in a side by side relationship with the second beam splitter 13. The first beam splitter 12 reflects the second laser beam which is emitted from the second light source 11 and reflected by the second beam splitter 13 and the first laser beam which is emitted from the first light source 10 and passes through the second beam splitter 13, toward the optical disc D.

A reflecting mirror 18 is provided such that it reflects the first and second laser beams which are reflected by the first beam splitter 12 after being emitted from the first and second light sources 10 and 11, toward the optical disc D. Further, a collimator lens 14 for shaping the beams reflected by the reflecting mirror 18 into parallel lights and an objective lens 15 for spotting the parallel light beams shaped by the collimator lens 14 onto the optical disc D are sequentially aligned. A photodiode 17 is arranged at one side of the first beam splitter 12 which is opposite to the reflecting mirror 18, to detect an error signal from the beams which are reflected from the optical disc D.

At this time, a digital video disc or a compact disc may be used as the optical disc D. When a digital video disc is used as the optical disc D, the first light source 10 is a laser diode which emits a laser beam of 650 nm wavelength, and the second light source 11 is a laser diode which emits a laser beam of 780 nm wavelength. On the contrary, the first light source 10 may be a laser diode which emits a laser beam of 780 nm wavelength, and the second light source 11 may be a laser diode which emits a laser beam of 650 nm wavelength.

In this third embodiment of the present invention, a stable spot can be achieved on the optical disc D using the same method as in the first and second embodiments. Moreover, since the first laser beam emitted from the first light source 10 is divided into 3 beams by the diffraction grating 19, when an error is detected through the photodiode 17, specifically, a tracking error can be easily detected.

Referring to FIG. 7, there is shown an optical pickup in accordance with a fourth embodiment of the present invention. In this embodiment, the same reference numerals are to be used to refer to parts which are the same as those of the first through third embodiments.

The optical pickup of this embodiment includes an optical disc D, a first light source 10 which emits a first laser beam of a first predetermined wavelength toward the optical disc D, and a second light source 11 which emits a second laser beam of a second predetermined wavelength which is different from the first predetermined wavelength, toward the optical disc D. The first light source 10 has a predetermined astigmatic difference.

In other words, as shown in FIG. 8, a light emitting section a of a laser diode which constitutes the first light source 10, has a predetermined thickness, and according to this, has an astigmatic difference of $\Delta Z$ in a parallel direction.

A grating lens 20 having the characteristic of the second beam splitter 13 described in the first through third embodiments is arranged on a path of the first laser beam of the first light source 10 having the astigmatic difference. In other words, the grating lens 20 has the same sloping angle and thickness, and generates the same astigmatism, as the second beam splitter 13 of the first through third embodiments.

The grating lens 20 is formed with a grated plane 21 on its surface which faces the first light source 10. The grated plane 21 divides the first laser beam emitted from the first light source 10 into 3 beams.

A beam splitter 12 is disposed in a side by side relationship with the grating lens 20. The beam splitter 12 reflects the second laser beam which is emitted from the second light source 11 and reflected by the grating lens 20 and the first laser beam which is emitted from the first light source 10 and passes through the grating lens 20, toward the optical disc D.

A reflecting mirror 18 is provided such that it reflects the first and second laser beams which are reflected by the beam splitter 12 after being emitted from the first and second light sources 10 and 11, toward the optical disc D. Further, a collimator lens 14 for shaping the beams reflected by the reflecting mirror 18 into parallel lights and an objective lens 15 for spotting the parallel light beams shaped by the collimator lens 14 onto the optical disc D are sequentially aligned. A photodiode 17 is arranged at one side of the beam splitter 12 which is opposite to the reflecting mirror 18, to detect an error signal from the beams which are reflected from the optical disc D.

At this time, a digital video disc or a compact disc may be used as the optical disc D. When a digital video disc is used as the optical disc D, the first light source 10 is a laser diode which emits a laser beam of 650 nm wavelength, and the second light source 11 is a laser diode which emits a laser beam of 780 nm wavelength. On the contrary, the first light source 10 may be a laser diode which emits a laser beam of 780 nm wavelength, and the second light source 11 may be a laser diode which emits a laser beam of 650 nm wavelength.

In this fourth embodiment of the present invention, a stable spot can be achieved on the optical disc D using the same method as in the first through third embodiments. Moreover, since the first laser beam emitted from the first light source 10 is divided into 3 beams while passing through the grating plane 21 of the grating lens 20, when an error is detected through the photodiode 17, specifically, a tracking error can be easily detected.

Namely, when compared to the third embodiment, even though a separate diffraction grating is not provided, the grating plane 21 of the grating lens 20 performs the function of not only the diffraction grating but also the second beam splitter, whereby the number of components can be lowered to reduce manufacturing cost and an optical system can be structurally simplified.

As described above, according to the present invention, an astigmatic difference of one light source emitting a light through a flat beam splitter is adjusted when constructing an optical pickup using two light sources having wavelengths of 650 nm and 780 nm and an astigmatism generated when the light passes through the flat beam splitter is adjusted, such that they are offset by each other, whereby beams emitted toward an optical disc can be stably spotted thereon even when the flat beam splitter is used instead of a costly cubic lens. Therefore, by the present invention, advantages are provided in that an optical system can be simplified in its structure and manufacturing cost can be reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:
1. An optical pickup comprising:
  a first light source having an astigmatic difference and emitting a first laser beam of a first predetermined wavelength toward an optical disc;
  a second light source emitting a second laser beam of a second predetermined wavelength which is different from the first predetermined wavelength, toward the optical disc;
  a first beam splitter arranged on a path of the first laser beam emitted from the first light source having the astigmatic difference, for reflecting the first laser beam toward the optical disc;

a second beam splitter disposed at one side of the first beam splitter such that it has a predetermined sloping angle, for reflecting the second laser beam emitted from the second light source toward the optical disc and for generating an astigmatism which can offset the astigmatic difference of the first light source when the first laser beam emitted from the first light source passes therethrough;

a reflecting mirror for totally reflecting the second laser beam which is emitted from the second light source and reflected by the second beam splitter and the first laser beam which is emitted from the first light source and passes through the second beam splitter;

a collimator lens for shaping the laser beams reflected by the reflecting mirror into parallel lights;

an objective lens for spotting the parallel light beams shaped by the collimator lens onto the optical disc; and a photodiode arranged at the other side of the first beam splitter for detecting an error signal from the beams which are reflected from the optical disc.

2. The optical pickup as claimed in claim 1, wherein the optical disc is a digital video disc, and the first light source is a laser diode which emits a laser beam of 650 nm wavelength.

3. The optical pickup as claimed in claim 1, wherein the optical disc is a compact disc, and the second light source is a laser diode which emits a laser beam of 780 nm wavelength.

4. The optical pickup as claimed in claim 1, wherein the optical disc is a compact disc, and the first light source is a laser diode which emits a laser beam of 780 nm wavelength.

5. The optical pickup as claimed in claim 1, wherein the optical disc is a digital video disc, and the second light source is a laser diode which emits a laser beam of 650 nm wavelength.

6. The optical pickup as claimed in claim 1, wherein, when assuming that the sloping angle of the second beam splitter is 18°, an index of refraction of the second beam splitter (n) is 1.51452 and the astigmatic difference of the first light source is 27 $\mu$m, a thickness of the second beam splitter (T) equals about 0.71 mm.

7. An optical pickup comprising:

a first light source having an astigmatic difference and emitting a first laser beam of a first predetermined wavelength toward an optical disc;

a second light source emitting a second laser beam of a second predetermined wavelength which is different from the first predetermined wavelength, toward the optical disc;

a first beam splitter arranged on a path of the first laser beam emitted from the first light source having the astigmatic difference, for reflecting the first laser beam toward the optical disc;

a diffraction grating positioned between the first beam splitter and the first light source, for dividing the first laser beam emitted from the first light source into 3 beams;

a second beam splitter disposed at one side of the first beam splitter such that it has a predetermined sloping angle, for reflecting the second laser beam emitted from the second light source toward the optical disc and for generating an astigmatism which can offset the astigmatic difference of the first light source when the first laser beam emitted from the first light source passes therethrough;

a reflecting mirror for totally reflecting the second laser beam which is emitted from the second light source and reflected by the second beam splitter and the first laser beam which is emitted from the first light source and passes through the second beam splitter;

a collimator lens for shaping the laser beams reflected by the reflecting mirror into parallel lights;

an objective lens for spotting the parallel light beams shaped by the collimator lens onto the optical disc; and a photodiode arranged at the other side of the first beam splitter for detecting an error signal from the beams which are reflected from the optical disc.

8. The optical pickup as claimed in claim 7, wherein the optical disc is a digital video disc, and the first light source is a laser diode which emits a laser beam of 650 nm wavelength.

9. The optical pickup as claimed in claim 7, wherein the optical disc is a compact disc, and the second light source is a laser diode which emits a laser beam of 780 nm wavelength.

10. The optical pickup as claimed in claim 7, wherein the optical disc is a compact disc, and the first light source is a laser diode which emits a laser beam of 780 nm wavelength.

11. The optical pickup as claimed in claim 7, wherein the optical disc is a digital video disc, and the second light source is a laser diode which emits a laser beam of 650 nm wavelength.

12. The optical pickup as claimed in claim 7, wherein, when assuming that the sloping angle of the second beam splitter ($\theta_1$) is 18°, an index of refraction of the second beam splitter (n) is 1.51452 and the astigmatic difference of the first light source is 27 $\mu$m, a thickness of the second beam splitter (T) equals about 0.71 mm.

13. An optical pickup comprising:

a first light source having an astigmatic difference and emitting a first laser beam of a first predetermined wavelength toward an optical disc;

a second light source emitting a second laser beam of a second predetermined wavelength which is different from the first predetermined wavelength, toward the optical disc;

a second beam splitter positioned between the first light source and the second light source such that it has a predetermined sloping angle, for reflecting the second laser beam emitted from the second light source toward the optical disc and for generating an astigmatism which can offset the astigmatic difference of the first light source when the first laser beam emitted from the first light source passes therethrough;

a diffraction grating positioned between the second beam splitter and the first light source, for dividing the first laser beam emitted from the first light source into 3 beams;

a second beam splitter for reflecting the second laser beam which is emitted from the second light source and reflected by the first beam splitter and the first laser beam which is emitted from the first light source and passes through the first beam splitter;

a reflecting mirror for totally reflecting the first and second laser beams reflected by the second beam splitter, toward the optical disc;

a collimator lens for shaping the laser beams reflected by the reflecting mirror into parallel lights;

an objective lens for spotting the parallel light beams shaped by the collimator lens onto the optical disc; and a photodiode arranged at one side of the second beam splitter which is opposite to the reflecting mirror, for detecting an error signal from the beams which are reflected from the optical disc.

14. The optical pickup as claimed in claim 13, wherein the optical disc is a digital video disc, and the first light source is a laser diode which emits a laser beam of 650 nm wavelength.

15. The optical pickup as claimed in claim 13, wherein the optical disc is a compact disc, and the second light source is a laser diode which emits a laser beam of 780 nm wavelength.

16. The optical pickup as claimed in claim 13, wherein the optical disc is a compact disc, and the first light source is a laser diode which emits a laser beam of 780 nm wavelength.

17. The optical pickup as claimed in claim 13, wherein the optical disc is a digital video disc, and the second light source is a laser diode which emits a laser beam of 650 nm wavelength.

18. The optical pickup as claimed in claim 13, wherein, when assuming that the sloping angle of the first beam splitter ($\theta_1$) is 18°, an index of refraction of the first beam splitter (n) is 1.51452 and the astigmatic difference of the first light source is 27 $\mu$m, a thickness of the first beam splitter (T) equals about 0.71 mm.

19. An optical pickup comprising:

a first light source having an astigmatic difference and emitting a first laser beam of a first predetermined wavelength toward an optical disc;

a second light source emitting a second laser beam of a second predetermined wavelength which is different from the first predetermined wavelength, toward the optical disc;

a grating lens positioned between the first light source and the second light source such that it has a predetermined sloping angle, for reflecting the second laser beam emitted from the second light source toward the optical disc and for generating an astigmatism which can offset the astigmatic difference of the first light source when the first laser beam emitted from the first light source passes therethrough, the grating lens being formed with a grated plane on its surface which faces the first light source, the grated plane dividing the first laser beam emitted from the first light source into 3 beams;

a beam splitter for reflecting the second laser beam which is emitted from the second light source and reflected by the grating lens and the first laser beam which is emitted from the first light source and passes through the grating lens;

a reflecting mirror for totally reflecting the first and second laser beams reflected by the beam splitter, toward the optical disc;

a collimator lens for shaping the laser beams reflected by the reflecting mirror into parallel lights;

an objective lens for spotting the parallel light beams shaped by the collimator lens onto the optical disc; and a photodiode arranged at one side of the beam splitter which is opposite to the reflecting mirror, for detecting an error signal from the beams which are reflected from the optical disc.

20. The optical pickup as claimed in claim 19, wherein the optical disc is a digital video disc, and the first light source is a laser diode which emits a laser beam of 650 nm wavelength.

21. The optical pickup as claimed in claim 19, wherein the optical disc is a compact disc, and the second light source is a laser diode which emits a laser beam of 780 nm wavelength.

22. The optical pickup as claimed in claim 19, wherein the optical disc is a compact disc, and the first light source is a laser diode which emits a laser beam of 780 nm wavelength.

23. The optical pickup as claimed in claim 19, wherein the optical disc is a digital video disc, and the second light source is a laser diode which emits a laser beam of 650 nm wavelength.

24. The optical pickup as claimed in claim 19, wherein, when assuming that the sloping angle of the grating lens ($\theta$) is 18°, an index of refraction of the grating lens (n) is 1.51452 and the astigmatic difference of the first light source is 27 $\mu$m, a thickness of the grating lens (T) equals about 0.71 mm.

* * * * *